United States Patent
Hill et al.

(10) Patent No.: US 9,957,176 B2
(45) Date of Patent: May 1, 2018

(54) LAGOON BIOLOGICAL TREATMENT METHOD AND SYSTEM

(71) Applicant: Triplepoint Environmental LLC, Oak Park, IL (US)

(72) Inventors: Patrick D Hill, Forest Park, IL (US); Braden J. Galbreath-O'Leary, Oak Park, IL (US); Michael C. Wever, Dothan, AL (US)

(73) Assignee: Triplepoint Environment LLC, Oak Park, IL (US)

( * ) Notice: Subject to any disclaimer, the term of this patent is extended or adjusted under 35 U.S.C. 154(b) by 98 days.

(21) Appl. No.: 14/640,689

(22) Filed: Mar. 6, 2015

(65) Prior Publication Data

US 2015/0251936 A1    Sep. 10, 2015

Related U.S. Application Data

(60) Provisional application No. 61/950,008, filed on Mar. 8, 2014.

(51) Int. Cl.
*C02F 3/30* (2006.01)
*C02F 3/00* (2006.01)
*C02F 103/00* (2006.01)

(52) U.S. Cl.
CPC .............. *C02F 3/006* (2013.01); *C02F 3/302* (2013.01); *C02F 2103/007* (2013.01); *C02F 2203/004* (2013.01); *C02F 2301/10* (2013.01); *C02F 2305/06* (2013.01); *Y02W 10/15* (2015.05)

(58) Field of Classification Search
CPC    Y02W 10/15; C02F 3/302; C02F 9/00; C02F 3/006; C02F 3/00; C02F 2101/16; C02F 3/02; C02F 3/121; Y10S 210/09; B01D 21/009
USPC ............... 210/170.09, 620, 630, 605, 170.06
See application file for complete search history.

(56) References Cited

U.S. PATENT DOCUMENTS

| | | | | |
|---|---|---|---|---|
| 3,764,523 A | * | 10/1973 | Stankewich, Jr. | C02F 1/52 210/604 |
| 3,964,998 A | * | 6/1976 | Barnard | C02F 3/1215 210/605 |
| 5,811,009 A | * | 9/1998 | Kos | C02F 3/12 210/605 |
| 5,861,095 A | * | 1/1999 | Vogel | C02F 3/00 210/150 |
| 7,445,715 B2 | | 11/2008 | Pehrson et al. | |

(Continued)

*Primary Examiner* — Claire A Norris
(74) *Attorney, Agent, or Firm* — Potomac Law Group, PLLC; Kenneth Fagin (57) ABSTRACT

The disclosed lagoon biological treatment system helps existing wastewater treatment facilities meet stricter discharge permits mandated by the EPA utilizing a facility's existing wastewater treatment infrastructure. Influent is pumped into and processed in an aerated or non-aerated lagoon system, thus initially treating the wastewater to remove BOD5 (Biochemical Oxygen Demand) and TSS (Total Suspended Solids) down to approximately 20-30 mg/L. Then the wastewater is transferred to and processed in a nitrification reactor that is designed to maintain a minimum water temperature needed to further treat the wastewater to stricter EPA standards. Wastewater may also be further processed in a denitrifying reactor if necessary to meet local requirement. Finally, effluent water is sent to a settling lagoon for final clarification prior to discharge.

15 Claims, 12 Drawing Sheets (56) References Cited

U.S. PATENT DOCUMENTS

| | | | |
|---|---|---|---|
| 7,465,394 B2 * | 12/2008 | Durda | C02F 3/103 |
| | | | 210/150 |
| 7,691,262 B2 | 4/2010 | Pehrson et al. | |
| 7,854,843 B2 | 12/2010 | Pehrson et al. | |
| 8,524,084 B2 | 9/2013 | Fassbender | |
| 2004/0159608 A1 * | 8/2004 | Hoffland | B01D 21/0012 |
| | | | 210/620 |
| 2004/0245173 A1 * | 12/2004 | Johnson | C02F 3/101 |
| | | | 210/615 |
| 2006/0086662 A1 * | 4/2006 | Ogden | C02F 3/32 |
| | | | 210/620 |
| 2009/0321350 A1 * | 12/2009 | Nelson | C02F 3/34 |
| | | | 210/610 |
| 2012/0152832 A1 * | 6/2012 | Johnson | C02F 3/02 |
| | | | 210/615 |

* cited by examiner

LAGOON BIOLOGICAL TREATMENT METHOD AND SYSTEM

CROSS-REFERENCE TO RELATED APPLICATION

This application is based on and claims the priority benefit of U.S. provisional application No. 61/950,008 filed Mar. 8, 2014, the contents of which are incorporated herein by reference.

BACKGROUND OF THE INVENTION

It is estimated that approximately one-third of all wastewater treatment facilities in the United States utilize a wastewater lagoon in some capacity during their treatment process. This means that there are more than 6,000 systems employing the use of wastewater lagoons in this country alone. That includes all fifty states, which translates to practically every American watershed, impacting the lives of millions of people nationwide. Lagoons, which can also be found in Canada and other parts of the world, became popular in the 1980's due to their simple design and low maintenance.

There are two different types of lagoon treatment processes, one known as a facultative or anaerobic lagoon and one aerated or aerobic lagoon. Facultative lagoon systems are typically comprised of several shallow ponds, 4-6 feet deep, with a typical overall retention time of 180 days. With the absence of oxygen, anaerobic bacteria break down the waste over a longer period of time. The clean effluent water can then be discharged either on a continuous basis or a periodic, controlled, basis. In controlled discharge systems, the water is stored in a separate storage lagoon and only discharged when water temperatures are likely to be warmer, typically spring (April and May) and fall (October and November) depending on the location of the facility and state regulations.

Aerated lagoons are typically deeper, 8-20 feet deep, and rely on either mechanical or diffused aeration for the supply of oxygen and mixing necessary to aerobically break down waste contaminants in the water. With typically 1-4 aeration cells, operated in series or parallel, aerobic lagoons generally have a retention time of anywhere between 20-40 days.

Properly designed lagoon systems can remove the common constituents found in a wastewater discharge permit, including Biochemical Oxygen Demand (BOD5) and Total Suspended Solids (TSS). However, water quality standards imposed by EPA in March 2006 have mandated State environmental regulators to begin imposing strict standards for ammonia (NH3-N), nitrite+nitrate, and total nitrogen (TN) discharge levels on all lagoon systems. This poses a problem for owners of lagoon systems as they were never designed with the intent of meeting stringent ammonia discharge limits.

For most lagoon owners, the existing options for meeting their new discharge permit are either to replace or radically change their entire facility. Many believe that replacing the wastewater lagoon with an advanced treatment system, such as a conventional activated sludge process, is the only way of achieving the lower discharge requirements. However, because advanced biological treatment processes are much more mechanical in their nature and require many more components that are both expensive to purchase and costly to install, this typically results in millions of dollars required for upfront capital costs even for the smallest of facilities. Moreover, with an increase in the amount of mechanical equipment, a facilities operation and maintenance budget often will double or triple in size. The average small community that operates lagoons today does not have large user base to spread these costs out over and, as a result, the cost of building and operating a mechanical treatment system is unfeasible. Indeed, for many of the small communities that still operate lagoon systems, this is undesirable today for many of the same reasons that such a mechanical treatment process was not originally selected: they do not have the financial wherewithal to either purchase or maintain and operate such a facility.

Accordingly, there is a need for a biological treatment process that is more cost effective from both a capital and operation cost perspective for existing lagoons to meet their new discharge requirements.

SUMMARY OF THE INVENTION

The disclosed system and method is a process and associated apparatus that suitably utilizes either existing or new treatment lagoon infrastructure along with the addition of a temperature-regulated nitrification reactor, and possibly a denitrification reactor where regulations require it. First, the influent wastewater is transferred into and processed in either an existing or new 1-cell or 2-cell aerated or non-aerated lagoon system, thus treating the wastewater in order to remove the majority of the BOD5 and TSS, for example down to approximately 20-45 mg/L. Then effluent from the primary lagoon(s) is transferred into and processed in a temperature-regulated nitrification process that is designed to provide the conditions for ammonia removal through nitrification and, subsequently and if necessary to meet local requirements, into a denitrification process for total nitrogen removal. Finally, the effluent water is either discharged or sent to an existing or new settling lagoon, or to another clarification device such as a circular clarifier, for final clarification prior to ultimate discharge.

Suitably, this Lagoon Biological Treatment method & system ("LBT") utilizes to the fullest extent possible any and all existing infrastructure while adding the minimal amount of equipment necessary to achieve new discharge permits. Because the nitrification reactor is compact, it is likely to fit into existing lagoon sites without the acquisition of new land. Moreover, due to the temperature regulation and insulation of the reactor, both the footprint and operating costs are kept to a minimum while achieving effluent discharge levels of <1 mg/L for ammonia and Total Nitrogen levels of 5-10 mg/L. As a result, the lagoon biological process allows lagoon facilities to upgrade their treatment capabilities with significantly reduced capital costs while not significantly increasing operating costs.

BRIEF DESCRIPTION OF THE DRAWINGS

The advantages and novel features of the invention will become apparent from the following description of the invention, below, in conjunction with the drawings in which.

EXEMPLARY EMBODIMENTS OF THE INVENTION

The present invention provides a method and system for new or existing wastewater lagoon systems, either aerated or non-aerated, to cost effectively meet more stringent effluent discharge requirements, including improving treatment of Ammonia, Nitrite+Nitrate, Total Nitrogen, BOD, and TSS. With the Lagoon Biological Treatment (LBT) method, a new or existing lagoon system will be able to accept raw wastewater from either a municipal or industrial source and through both aerobic and anoxic processes, achieve approximate effluent of 10-20 mg/L BOD/TSS, <1 mg/L Ammonia and 5-10 mg/L Nitrate or Total Nitrogen without the need to build a fully mechanical treatment system, such as an activated sludge plant.

Figure 1:
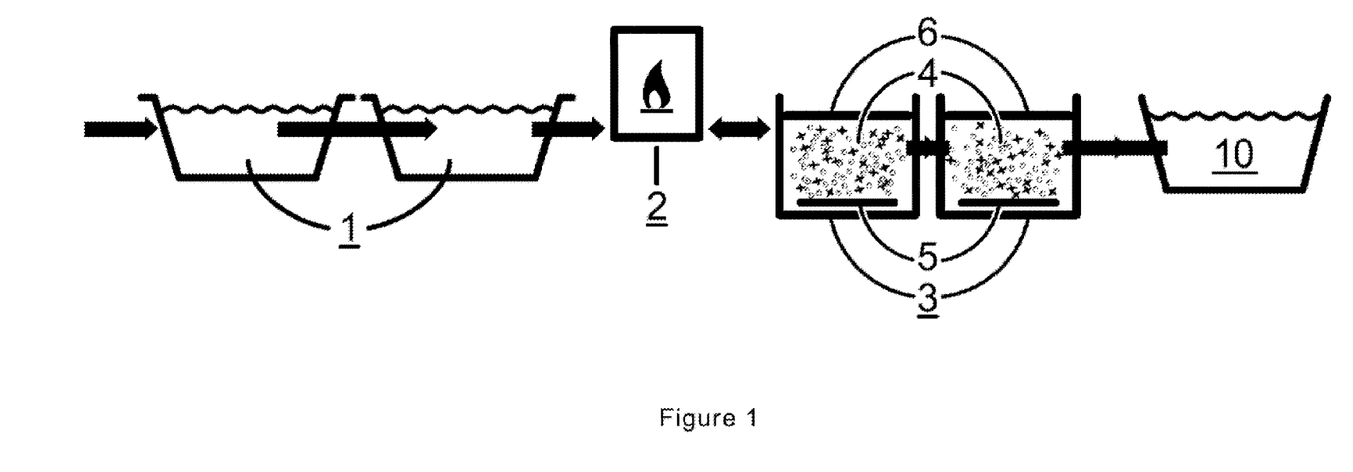
FIG. 1 is a schematic, process flow diagram illustrating how wastewater flows through and is processed in one embodiment of an LBT Process according to the invention.

A first embodiment of an LBT system according to the invention is illustrated in FIG. 1. As illustrated therein, with the LBT method, first wastewater is transferred into the wastewater lagoon facility where the initial objective is to reduce BOD and TSS to lower levels in order to promote ammonia removal through nitrification. This happens initially in the lagoon portion 1. Research in the field of activated sludge wastewater treatment demonstrated that the BOD must be sufficiently reduced to eliminate bacterial competition; generally a BOD level of 20-45 mg/L is ideal. The majority of lagoon systems, if operated according to this method, have the facilities in place to achieve BOD/TSS removal down to 20-45 mg/L at design flow and loadings. Therefore, the LBT process can utilize this pre-existing capability to avoid the need to upgrade this component if such an upgrade is not otherwise necessary (e.g., for equipment-related reasons).

There are two benefits to this approach. First, in this initial stage, the lagoon does not have to be aerated; regardless of whether there is partial-mix, complete-mix, or no aeration, the LBT method can achieve the stricter discharge standards. The only objective is that the new or existing infrastructure is capable of reducing the majority of the BOD/TSS to levels approximately of 20-45 mg/L, when operated appropriately. As a result, in instances of an existing non-aerated lagoon or a partial mix aerated lagoon, both equipment and energy costs are saved by not needing to install new aeration equipment. Second, because the LBT method can incorporate this existing infrastructure, as opposed to the activated sludge alternative that replaces it, costs are saved on both equipment and infrastructure. Moreover, operation and maintenance costs remain the same for that portion of the system, giving a measure of predictability for future budgeting.

After the wastewater is initially processed in the lagoon portion 1, it is transferred to the part of the system where ammonia can be removed via nitrification in a nitrification reactor 3, which provides an environment for nitrifying bacteria of various art-known species to nitrify and remove ammonia. While some (or even all) of the necessary nitrification can be achieved in the lagoon portion 1 during the summer months, in winter the majority of the ammonia removal occurs in this part of the process, i.e., in the nitrification reactor 3.

As illustrated in the embodiment depicted in FIG. 1, the nitrification reactor 3 can include two temperature-regulated wastewater tanks operated in series with submerged aeration and attached growth media. As indicated by research in the separate field of activated-sludge wastewater treatment, wastewater temperature plays a notable role in nitrification. In particular, as water temperatures decrease, nitrifying bacteria become dormant and nitrification efficiency drops significantly, halting completely at 0 degrees centigrade (deg C.). Although predictable nitrification can occur at temperatures as low as 4 deg C., for lagoons located in colder climates, typical surface discharge water from the primary treatment section can be <1 deg C. in winter.

Therefore, part of the LBT process according to this disclosure is regulation of the temperature of the water in order to promote nitrification. In this regard, a suitable water temperature inside the nitrification reactor is on the order of 4 deg C. or more. While numerous methods can be used to ensure that the water temperature inside the nitrification reactor 3 is at the minimum required level, three approaches are outlined here and below. Water temperature regulation entails ensuring both that the water temperature is at least at the minimum level and that it is maintained at that level during the nitrification process. In the embodiment illustrated in FIG. 1, the source of heat 2 used to regulate water temperature in the nitrification reactor 3 is located external to the nitrification reactor 3, e.g., it can be a boiler-based heat-exchanger. In this case, water is drawn from the nitrification reactor 3, circulated through the heat-exchanger, and returned to the nitrification reactor 3 as indicated by the double-headed arrow in FIG. 1. Wastewater may also be heated as it is transferred from the lagoon portion of the system 1 to the nitrification reactor 3, e.g., by being passed through the same heat-exchanger or through a separate, in-line heat-exchanger.

As noted above, a second aspect of temperature regulation is maintaining the water temperature to ensure the water does not become colder while in the nitrification reactor 3. This can be achieved by utilizing any number of measures that are considered current best practices to prevent cooling and heat loss from the water. For example, the various wastewater tanks can be buried in the ground, thereby utilizing the ground as insulation. Moreover, insulated covers 6, to prevent heat loss due to evaporation and contact with the ambient air, can be provided to cover the various tanks. The specific methods of maintaining water temperature may, of course, depend on the particular needs and conditions of each specific installation.

Furthermore, each tank within the nitrification reactor 3 is aerated and filled with small pieces of porous media 4 (for increased surface area) that provide a habitat for nitrifying bacteria to attach and grow, thereby exponentially increasing the rate of biological activity. Air (i.e., oxygen) is supplied to the nitrification reactor 3 by a motor-operated blower (not shown) or equivalent device and is diffused into the wastewater via aerators 5. The diffused aeration provides oxygen necessary for the nitrifying bacteria to thrive, and it mixes the water to ensure that there are no stagnant areas in the tank. Through the combination of oxygen from the air diffusers, appropriate water temperature as a result of regulation, and attached growth media that promote enhanced bacterial activity and retention time, the nitrification reactor is able to rapidly nitrify ammonia regardless of ambient temperatures.

(One of the benefits of such a nitrification system 3 is very low maintenance and relatively long product life. This is primarily due to the fact that the attached growth media pieces are self-cleaning; as they tumble in the water column, they are constantly hitting against each other, thereby knocking off excess biomass. As a result, maintenance costs are minimized, as no substantial replacement is necessary for approximately 15-20 years.)

The water temperature-regulation feature of the invention has several important benefits. First, because the water temperature is manipulated and maintained, biological treatment is enhanced, thereby making it possible to achieve the nitrification and hence higher effluent quality required to meet local standards and regulations despite ambient temperatures. Second, retention of heat allows the reactor to be smaller, thereby minimizing its footprint and reducing materials/labor to install while making it more likely that lagoon owners can construct such systems on existing sites without purchasing new land, thereby lowering upfront costs. (For example, a typical nitrification reactor may take up 250-500 square feet of land, whereas the alternative of changing the process to a controlled discharge system would require the construction of 8-10 acre storage lagoons that likely would require additional land to be purchased.) Finally, a higher water temperature ensures that the bacteria are more efficient in their treatment; this means that the reactor size and horsepower is significantly less than may otherwise be necessary. As a result, lower blower horsepower and usage is necessary, which leads to lower overall operating cost of the reactor.

After nitrification in the nitrification reactor 3, the water can be clarified prior to effluent discharge. Because the reactor influent water comes from a lagoon portion 1 that can see turnover in spring/fall, which can increase the suspended solids in the influent, the TSS of effluent coming out of the nitrification reactor 3 can be >40 mg/L, which is higher than most lagoon effluent discharge permits will allow. Therefore, the LBT method preferably utilizes a final clarification stage 10 prior to discharge. Thus, the treated wastewater is transferred from the nitrification reactor 3 into a non-aerated quiescent cell, where any remaining solids in the water will fall by gravity to the bottom of the cell so as to reduce TSS levels. (Most lagoon systems already have a settling cell in place to receive treated water prior to discharge, so there would be no need to build a new one; also, this stage does not require any mechanical equipment, which makes it inexpensive to operate and maintain.)

Figure 2:
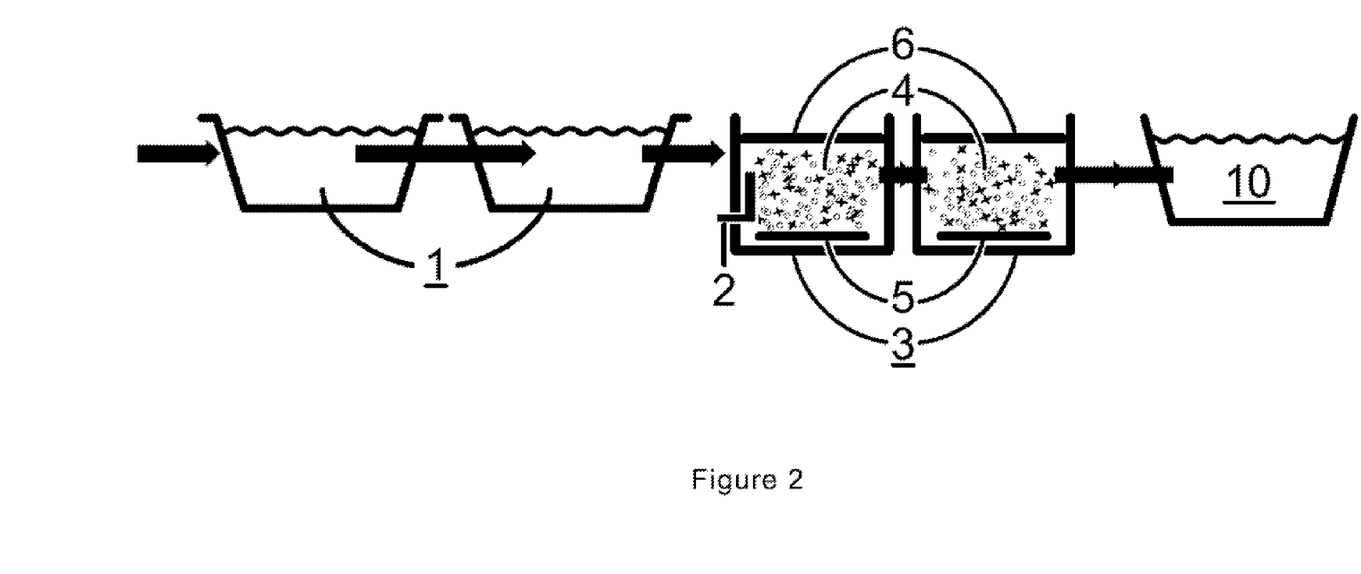
FIG. 2 is a schematic, process flow diagram illustrating how wastewater flows through and is processed in a second embodiment of an LBT Process according to the invention.

In another embodiment illustrated in FIG. 2, where the same reference numerals are used to depict the same elements as in FIG. 1, the source of heat 2 used to regulate water temperature in the nitrification reactor 3 could be located within the nitrification reactor 3. For example, the source of heat 2 could be a number of electrical resistance-based immersion heaters distributed around and/or throughout the interior of the nitrification reactor vessels.

Figure 3:
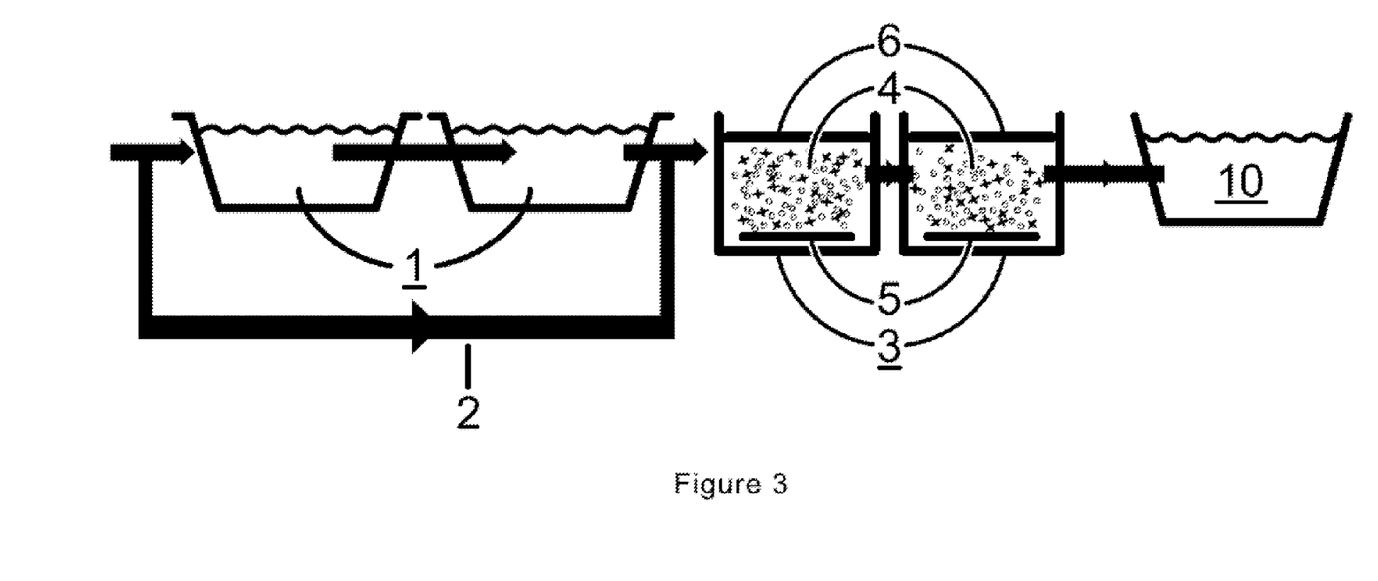
FIG. 3 is a schematic, process flow diagram illustrating how wastewater flows through and is processed in a third embodiment of an LBT Process according to the invention.

In still a third embodiment illustrated in FIG. 3, where the same reference numerals are used to depict the same elements as in FIG. 1, another method of ensuring the water temperature is at the minimum level entails blending a portion of warmer influent water with the potentially colder water that results from the lagoon processing stage. In this case, the warmer influent water functions as the source of heat 2. Common municipal influent wastewater is approximately 13.5 deg C. coming into a wastewater plant. Thus, by blending this warmer water with the colder primary effluent water leaving the lagoon portion 1 and entering the nitrification reactor 3 at, for example, a 3 to 1 ratio, the overall temperature of the water entering the reactor 3 can be increased to 5 deg C. for nitrification. The benefit of this approach is that it requires no further mechanical means for increasing the water temperature and thus avoids higher capital, operation, and maintenance costs.

Figure 4:
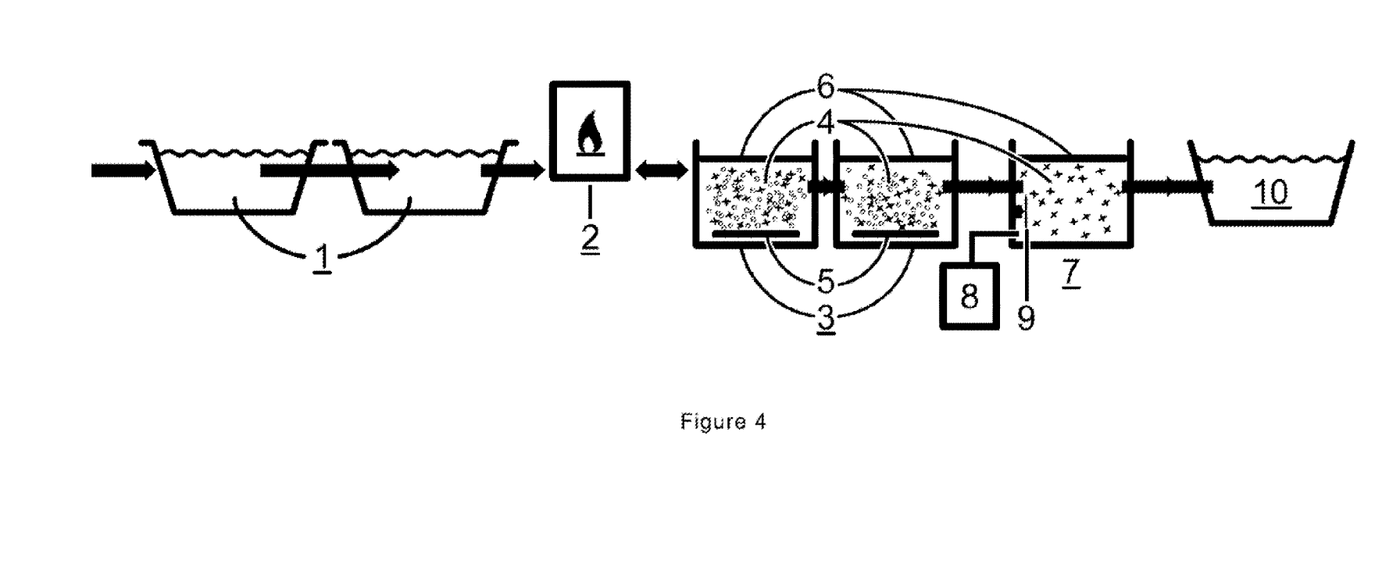
FIG. 4 is a schematic, process flow diagram illustrating how wastewater flows through and is processed in a fourth embodiment of an LBT Process according to the invention.
Figure 5:
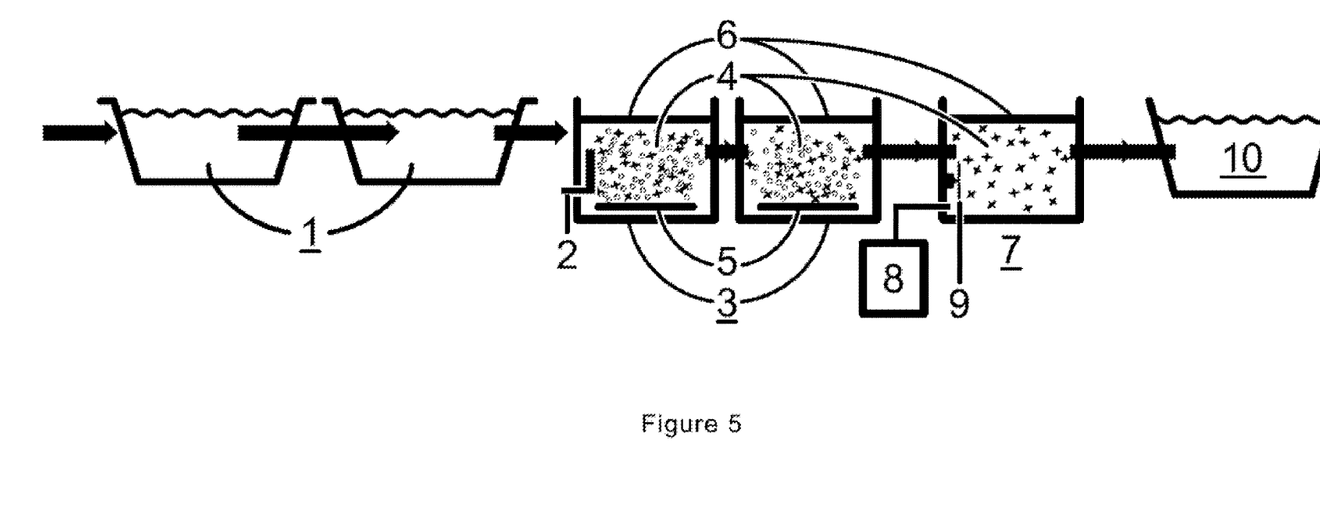
FIG. 5 is a schematic, process flow diagram illustrating how wastewater flows through and is processed in a fifth embodiment of an LBT Process according to the invention.
Figure 6:
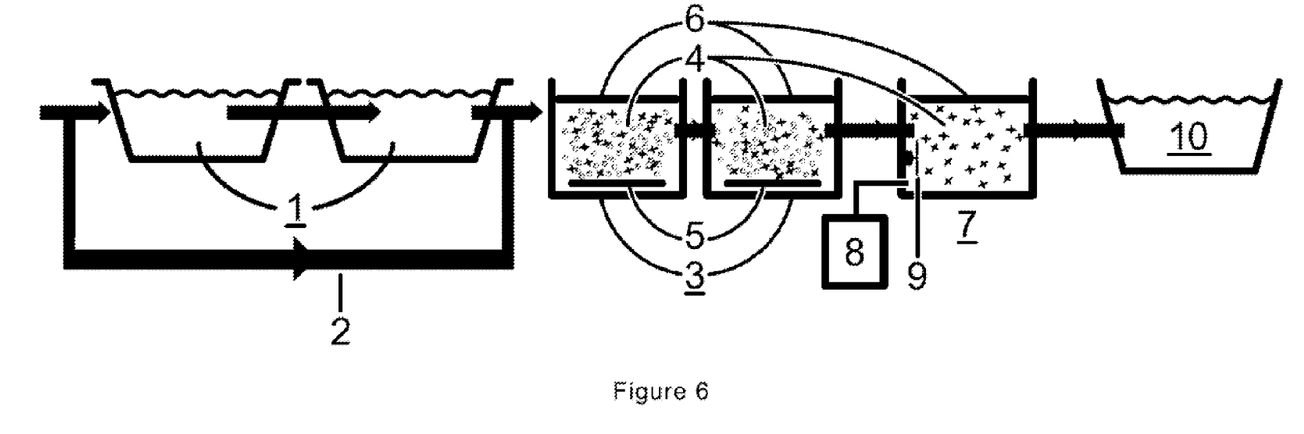
FIG. 6 is a schematic, process flow diagram illustrating how wastewater flows through and is processed in a sixth embodiment of an LBT Process according to the invention.
Figure 7:
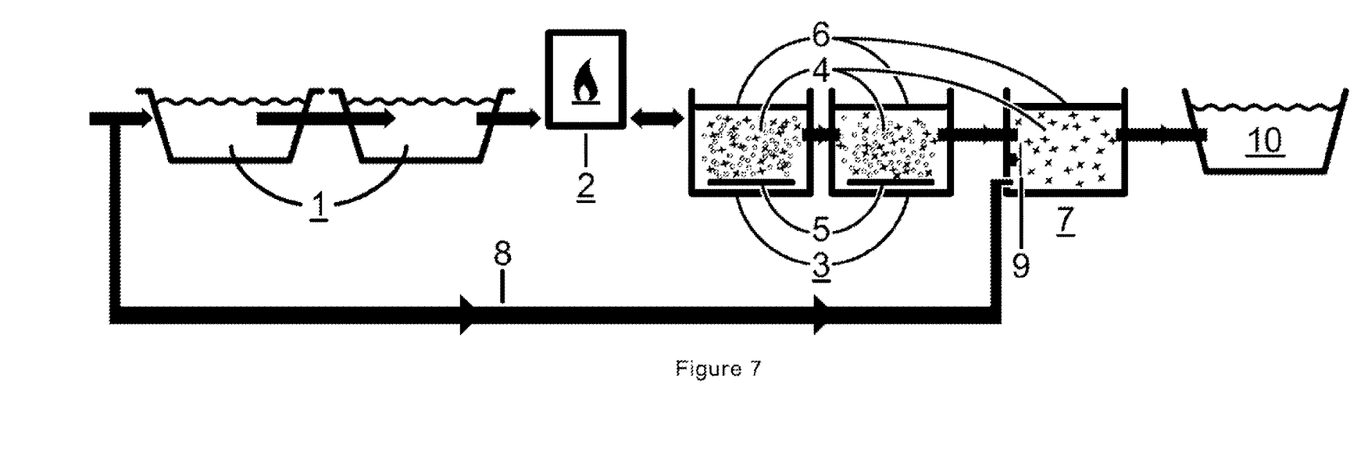
FIG. 7 is a schematic, process flow diagram illustrating how wastewater flows through and is processed in a seventh embodiment of an LBT Process according to the invention.
Figure 8:
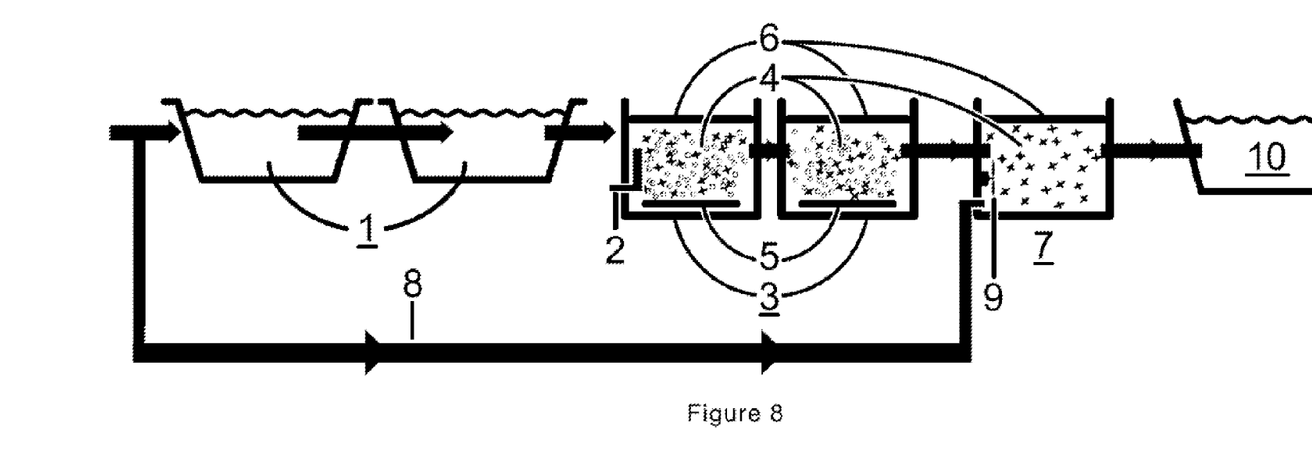
FIG. 8 is a schematic, process flow diagram illustrating how wastewater flows through and is processed in an eighth embodiment of an LBT Process according to the invention.
Figure 9:
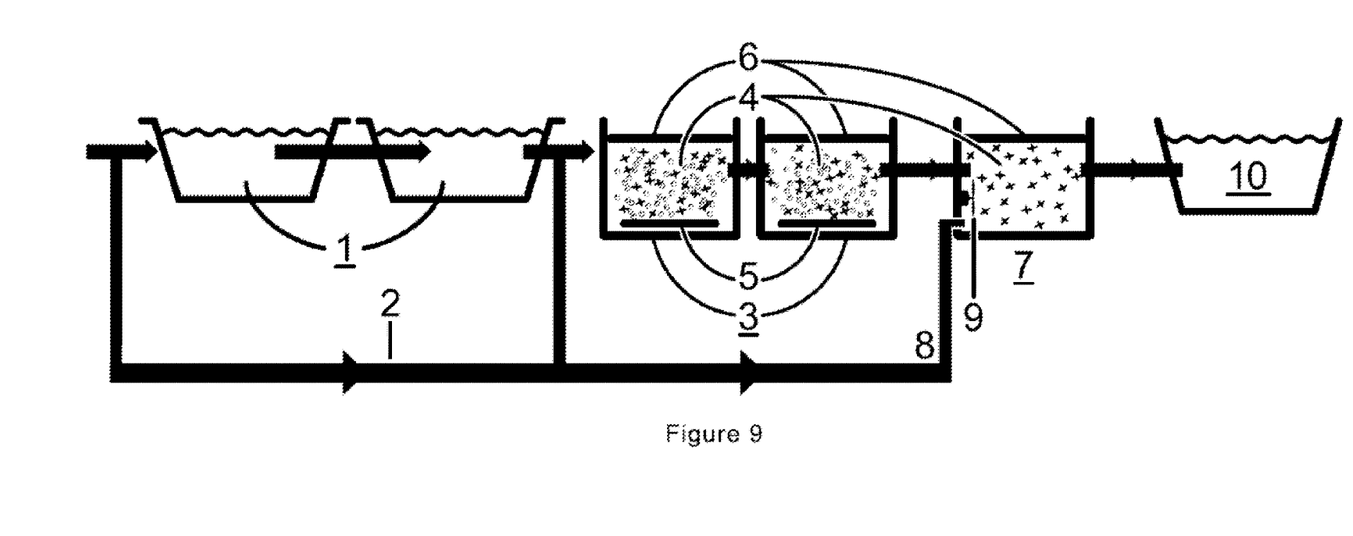
FIG. 9 is a schematic, process flow diagram illustrating how wastewater flows through and is processed in a ninth embodiment of an LBT Process according to the invention.

While systems as illustrated in the three embodiments described above provide excellent nitrification and reduction of ammonia levels, many jurisdictions now require, or soon will require, that total nitrogen (i.e., nitrite and nitrate) be reduced or eliminated before wastewater is discharged. In that case, a facility according to the invention may further include an anoxic denitrification reactor 7, which utilizes anaerobic bacteria, as illustrated in FIGS. 4-9. Thus, in such a facility, wastewater is transferred from the nitrification reactor 3 to the denitrification reactor 7 for further, denitrifying treatment before it is allowed to settle in the clarification stage 10. The denitrification reactor 7 includes attached growth media and a mechanical mixer 9, e.g., a pump or impeller, which ensures proper mixing for the bacteria to access the nutrients in the wastewater on which they feed. Furthermore, the anaerobic bacteria in the denitrification reactor 7 require a carbon source 8 to function, and this may be provided by dosing carbon from a "synthetic" source of carbon as illustrated in each of FIGS. 4-6. (The means by which water temperature is regulated in the nitrification reactor 3 in each of FIGS. 4-6 is the same as the means by which water temperature is regulated in the nitrification reactor 3 in each of FIGS. 1-3, respectively.) Alternatively, the anaerobic bacteria in the denitrification reactor 7 may be supplied with carbon by pumping a portion of carbon-rich influent into the denitrification reactor 7, as illustrated in each of FIGS. 7-9, in which case the influent itself functions as the carbon source 8. (The means by which water temperature is regulated in the nitrification reactor 3 in each of FIGS. 7-9 is the same as the means by which water temperature is regulated in the nitrification reactor 3 in each of FIGS. 1-3, respectively.) Through the combination of mixing, carbon, and anoxic conditions, nitrate resulting from nitrification in the reactor 3 is converted into nitrogen gas in the reactor 7 and simply escapes from the water in gaseous form.

The foregoing disclosure is only intended to be exemplary of the methods and products of the present invention. Departures from and modifications to the disclosed embodiments may occur to those having skill in the art.

Figure 10:
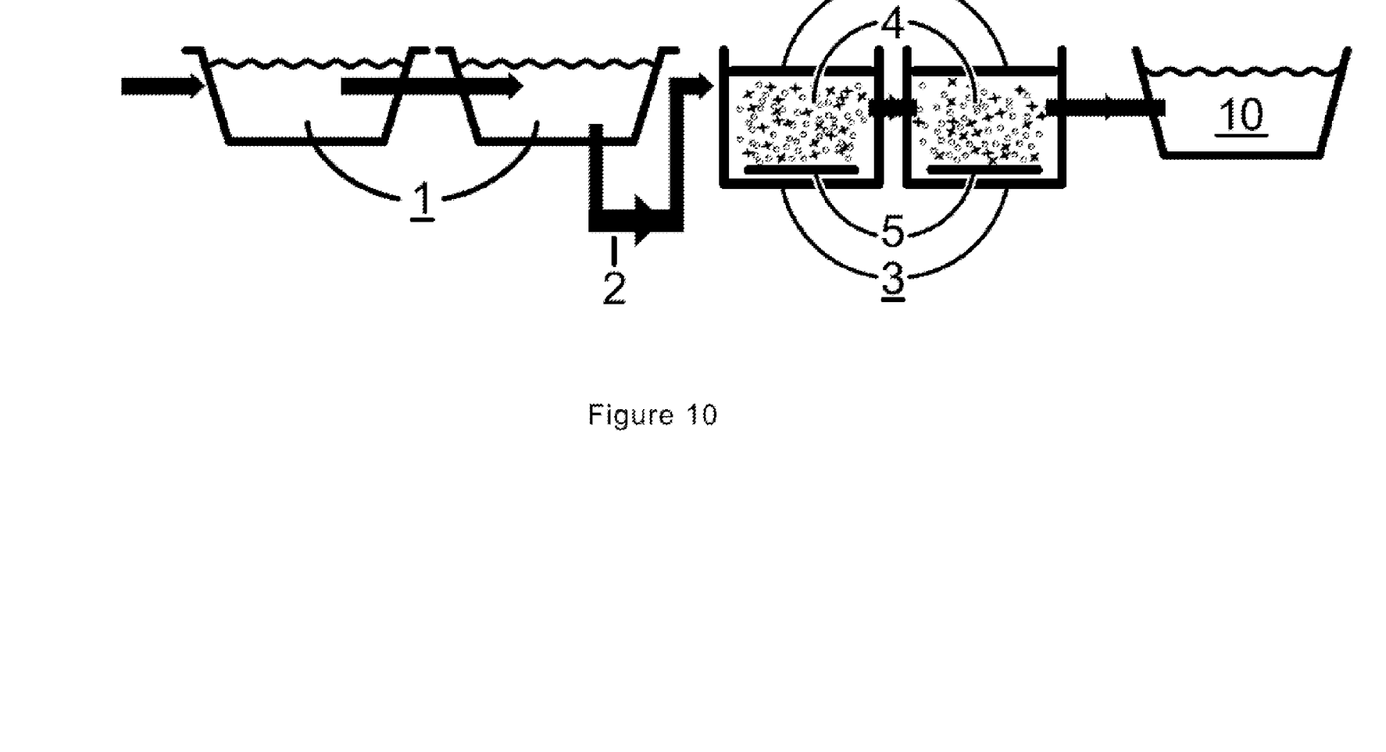
FIG. 10 is a schematic, process flow diagram illustrating how wastewater flows through and is processed in a tenth embodiment of an LBT Process according to the invention.
Figure 11:
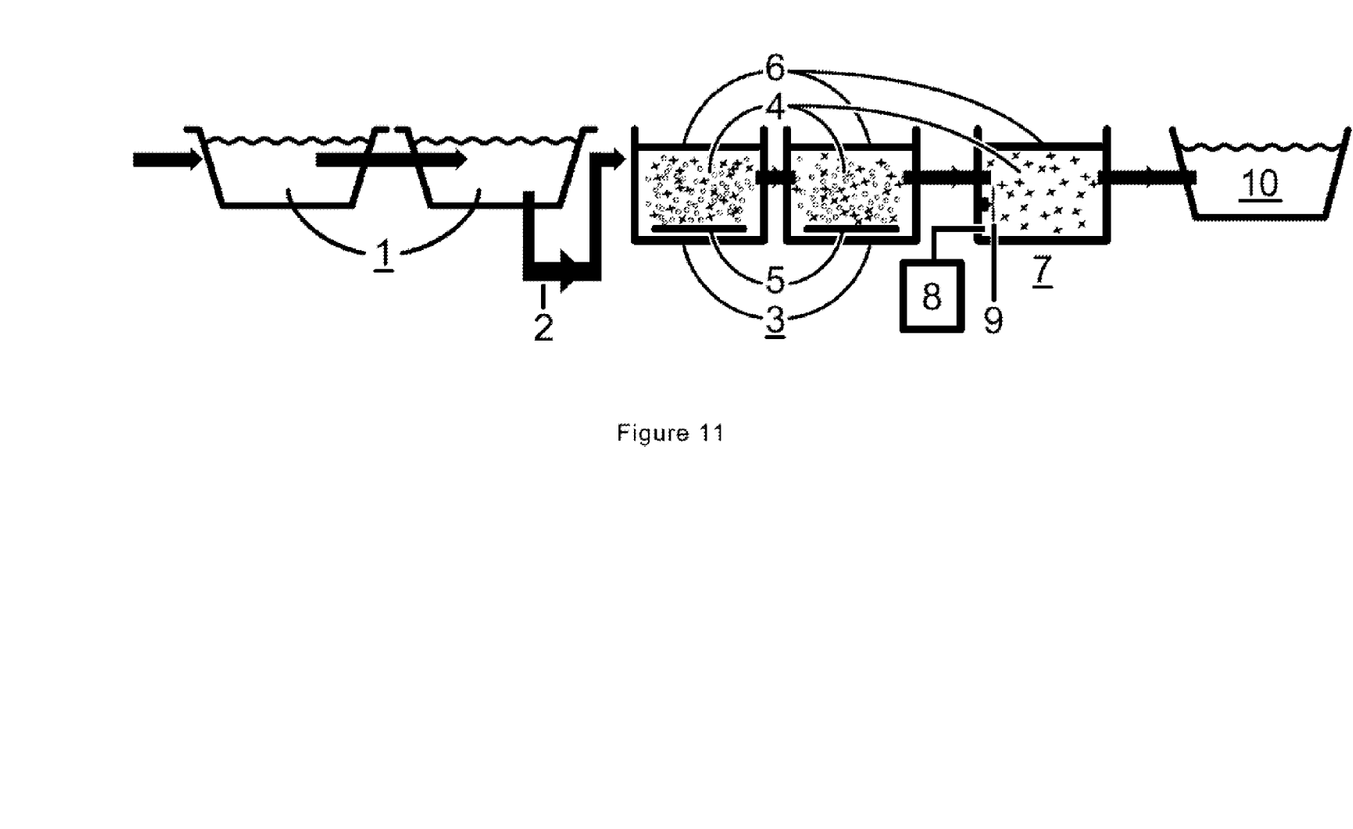
FIG. 11 is a schematic, process flow diagram illustrating how wastewater flows through and is processed in an eleventh embodiment of an LBT Process according to the invention.
Figure 12:
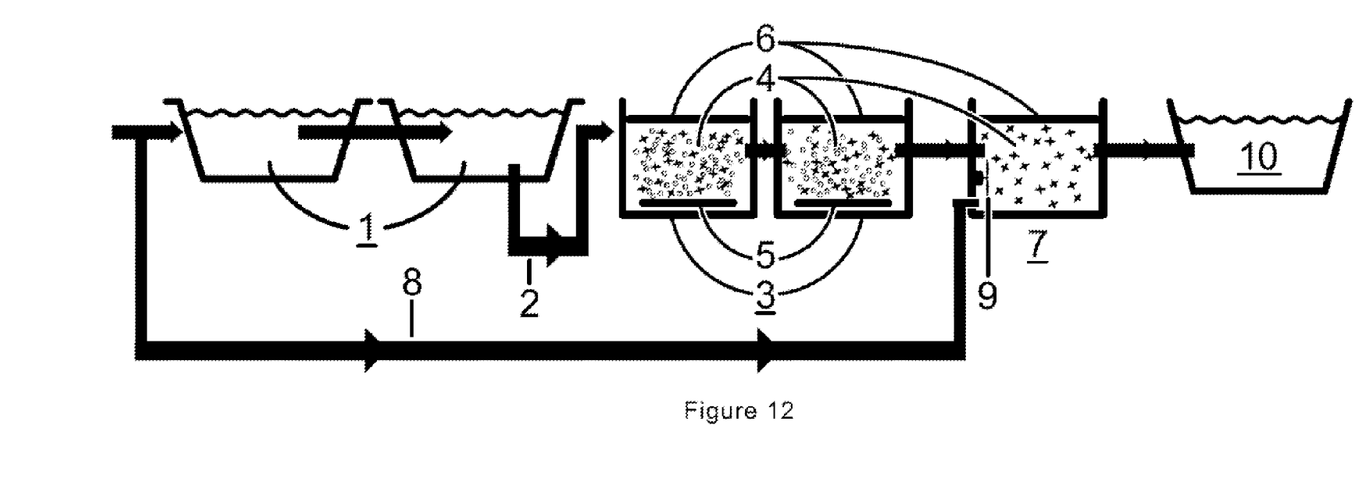
FIG. 12 is a schematic, process flow diagram illustrating how wastewater flows through and is processed in a twelfth embodiment of an LBT Process according to the invention.

For example, water temperature within the nitrification reactor could alternatively be regulated by extracting water to be transferred to the nitrification reactor 3 from the bottom of the lagoon portion 1, where it is likely to be warmer, as shown in FIGS. 10 (no denitrification reactor present), 11 (denitrification reactor 7 present, with "synthetic" source of carbon 8); and 12 (denitrification reactor 7 present, with influent wastewater functioning as source of carbon 8). Due to the colder ambient temperatures at the surface of the water in the lagoon portion 1, thermal stratification can occur in both non-aerated and partial-mix aerated lagoons such that water at the bottom of the lagoon portion 1 is warmer than at the top. In certain cases, primarily depending on the depth of a lagoon, the water at the bottom can be within the minimum range. As a result, all that would be needed to ensure the temperature is at the minimum level would for water to be extracted from the lagoon portion 1 at the right location.

Still further, waste heat coming from the motor of the blower (not illustrated) used to aerate the nitrification reactor 3 could be harnessed to regulate the temperature of the water in the reactor 3.

The scope of the invention is set forth in the following claims.

We claim:

1. A method for treating wastewater, comprising:
    introducing influent wastewater into a lagoon and allowing the influent wastewater to sit for a period of time in a manner that causes both of biochemical oxygen demand (BOD5) and total suspended solids (TSS) levels within the wastewater in the lagoon to be reduced;
    after the wastewater has sat in the lagoon for said period of time, transferring partially processed wastewater having reduced levels of BOD5 and TSS from the lagoon to a separate nitrification reactor;
    regulating the temperature of wastewater within the nitrification reactor to keep the temperature thereof at or above a minimum value, the wastewater within the nitrification reactor comprising said partially processed wastewater that has been transferred to the nitrification reactor;
    allowing ammonia levels within the wastewater held within the nitrification reactor to be reduced through aerobic, bacterial-based nitrification; and
    discharging product fluid from the nitrification reactor, the product fluid comprising wastewater that has been processed to reduce BOD5 and TSS as well as ammonia levels to at or below predetermined maximum levels;
    wherein said regulating the temperature of wastewater within the nitrification reactor comprises adding heat to the wastewater within the nitrification reactor or adding heat to partially processed wastewater as it is being transferred to the nitrification reactor.

2. The method of claim 1, wherein temperature of the wastewater within the nitrification reactor is regulated by a heating device that is located external to the nitrification reactor.

3. The method of claim 1, wherein temperature of the wastewater within the nitrification reactor is regulated by a heating device that is located internal to the nitrification reactor.

4. The method of claim 1, wherein temperature of the wastewater within the nitrification reactor is regulated by mixing a portion of influent wastewater with said partially processed wastewater transferred from the lagoon to the nitrification reactor such that the wastewater within the nitrification reactor comprises a mixture of influent wastewater and partially processed wastewater.

5. The method of claim 1, wherein temperature of the wastewater within the nitrification reactor is regulated by drawing wastewater to be transferred to the nitrification reactor from a bottom region of the lagoon.

6. The method of claim 1, wherein regulating temperature of the wastewater within the nitrification reactor further comprises passively retarding loss of heat from the wastewater within the nitrification reactor.

7. The method of claim 1, further comprising transferring the product fluid from the nitrification reactor to a denitrification reactor and allowing nitrate to be removed from the product fluid in the denitrification reactor via anoxic, bacterial-based denitrification.

8. The method of claim 7, further comprising dosing carbon to the denitrification reactor to support the anoxic bacteria therein.

9. The method of claim 8, wherein carbon is dosed from a synthetic source.

10. The method of claim 8, wherein carbon is dosed by mixing a portion of influent wastewater with wastewater contained within the denitrification reactor.

11. The method of claim 1, further comprising transferring the product fluid from the nitrification reactor to a settling or clarifying stage.

12. The method of claim 7, further comprising transferring product fluid from the denitrification reactor to a settling or clarifying stage.

13. The method of claim 1, wherein the wastewater is aerated while it is sitting in the lagoon.

14. The method of claim 1, wherein the wastewater sits quiescently in the lagoon without aeration.

15. The method of claim 1, wherein nitrification is conducted within the nitrification reactor using attached-growth media.

* * * * *